United States Patent
Aoki et al.

(10) Patent No.: US 11,134,296 B2
(45) Date of Patent: Sep. 28, 2021

(54) INFORMATION PROCESSING APPARATUS, METHOD THEREFOR, AND NON-TRANSITORY COMPUTER READABLE MEDIUM STORING INFORMATION PROCESSING PROGRAM

(71) Applicant: Agama-X Co., Ltd., Tokyo (JP)

(72) Inventors: Kosuke Aoki, Kanagawa (JP); Tsutomu Kimura, Kanagawa (JP); Shinji Onishi, Kanagawa (JP)

(73) Assignee: Agama-X Co., Ltd., Tokyo (JP)

( * ) Notice: Subject to any disclaimer, the term of this patent is extended or adjusted under 35 U.S.C. 154(b) by 0 days.

(21) Appl. No.: 16/513,718

(22) Filed: Jul. 17, 2019

(65) Prior Publication Data

US 2020/0245015 A1     Jul. 30, 2020

(30) Foreign Application Priority Data

Jan. 28, 2019   (JP) .............................. JP2019-012192

(51) Int. Cl.
| | |
|---|---|
| *H04H 60/56* | (2008.01) |
| *H04N 21/422* | (2011.01) |
| *H04N 21/81* | (2011.01) |
| *H04N 21/466* | (2011.01) |

(52) U.S. Cl.
CPC ... *H04N 21/42201* (2013.01); *H04N 21/4667* (2013.01); *H04N 21/8113* (2013.01)

(58) Field of Classification Search
CPC ......... H04N 21/42201; H04N 21/4667; H04N 21/8113
See application file for complete search history.

(56) References Cited

U.S. PATENT DOCUMENTS

| | | | |
|---|---|---|---|
| 2014/0223462 A1* | 8/2014 | Aimone ................. | G16H 40/67 725/10 |
| 2016/0366462 A1* | 12/2016 | Klappert .......... | H04N 21/44218 |
| 2018/0296136 A1* | 10/2018 | Foxlin .................. | A61B 5/1171 |
| 2020/0045042 A1* | 2/2020 | Peng ..................... | H04L 9/3239 |

FOREIGN PATENT DOCUMENTS

JP        2010-218491        9/2010

\* cited by examiner

*Primary Examiner* — Kyu Chae

(57) ABSTRACT

An information processing apparatus includes an addition unit that enables communication between a bio-information measurement device and the information processing apparatus, and adds information specifying an individual who is using the information processing apparatus to information measured by the bio-information measurement device.

12 Claims, 18 Drawing Sheets

FIG. 7

| USER ID | PORTABLE INFORMATION PROCESSING APPARATUS ID |
|---|---|
| USER A | SMARTPHONE A |
| USER B | SMARTPHONE B |

FIG. 8

| PORTABLE INFORMATION PROCESSING APPARATUS ID | DEVICE ID |
|---|---|
| SMARTPHONE A | DEVICE 1 |
| SMARTPHONE B | DEVICE 2 |

FIG. 9

| CALIBRATION ID 910 | USER ID 920 | PORTABLE INFORMATION PROCESSING APPARATUS ID 930 | DEVICE ID 940 | DATE-AND-TIME 950 | CALIBRATION VALUE 960 |
|---|---|---|---|---|---|
| R1 | USER A | SMARTPHONE A | DEVICE 1 | Y1, M1, H1, M1 | |
| R2 | USER B | SMARTPHONE B | DEVICE 2 | Y2, M2, H2, M2 | |

| DEVICE ID (1110) | DATE-AND-TIME (1120) | BIOMETRIC DATA (1130) |
|---|---|---|
| | | |

| USER ID (1210) | DEVICE ID (1220) | DATE-AND-TIME (1230) | BIOMETRIC DATA (1240) |
|---|---|---|---|
| | | | |

1200

INFORMATION PROCESSING APPARATUS, METHOD THEREFOR, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-012192 filed Jan. 28, 2019.

BACKGROUND

(i) Technical Field

The present disclosure relates to an information processing apparatus and a non-transitory computer readable medium storing an information processing program.

(ii) Related Art

JP2010-218491A discloses a content distribution system which is made to distribute content data applicable to a user based on the user's brainwave, in which brainwave data of the user is measured by a brainwave sensor and transmitted from a brainwave detection unit to a content recommendation system; a user group discrimination unit specifies a group to which the user belongs based on the brainwave data; a content selection unit selects a predetermined content assigned to each user group in advance; and a design control unit arranges the predetermined content on a web page to be transmitted to the user's computer.

SUMMARY

It is known that biometric information such as brainwave of a user is measured using a bio-information measurement device. However, it is possible to identify the user with the biometric information only. Aspects of non-limiting embodiments of the present disclosure relates to an information processing apparatus and a non-transitory computer readable medium storing an information processing program that information specifying an individual who is using the information processing apparatus is added to information measured by a bio-information measurement device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an addition unit that enables communication between a bio-information measurement device and the information processing apparatus, and adds information specifying an individual who is using the information processing apparatus to information measured by the bio-information measurement device.

BRIEF DESCRIPTION OF THE DRAWINGS

Exemplary embodiment(s) of the present invention will be described in detail based on the following figures, wherein:

FIG. 7 is a diagram illustrating an example of a data structure of a user/portable information processing apparatus correspondence table;

FIG. 8 is a diagram illustrating an example of a data structure of a portable information processing apparatus/device correspondence table;

FIG. 9 is a diagram illustrating an example of a data structure of a calibration management table;

FIG. 11 is a diagram illustrating an example of a data structure of a biometric data table;

FIG. 12 is a diagram illustrating an example of a data structure of a biometric data table;

DETAILED DESCRIPTION

Hereinafter, exemplary embodiments in realizing the invention will be described with reference to the accompanying drawings.

Figure 1:
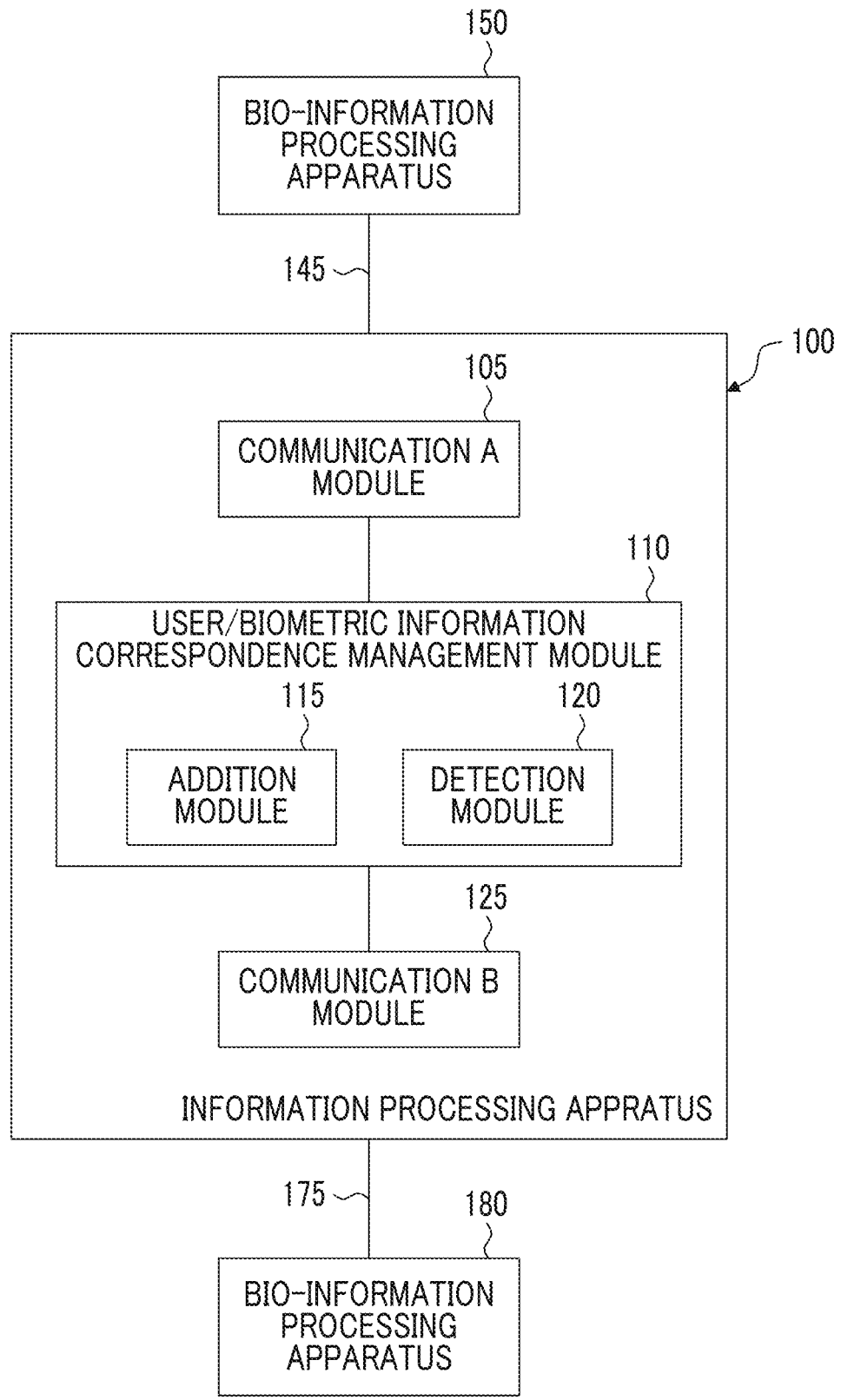
FIG. 1 is a conceptual module configuration diagram illustrating a configuration example according to this exemplary embodiment.

FIG. 1 is a conceptual module configuration diagram illustrating a configuration example according to this exemplary embodiment.

Meanwhile, the term "module" refers to components such as software (including computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication link, and registers, and the like inside a central processing unit (CPU).

An information processing apparatus 100 which is this exemplary embodiment has a function of transmitting biometric information measured by a bio-information measurement device 150 to a bio-information processing apparatus 180, includes a communication A module 105, a user/biometric information correspondence management module 110 and a communication B module 125, and is connected to the bio-information measurement device 150 via a communication link 145 and to connected to the bio-information processing apparatus 180 via a communication link 175, as illustrated in the example of FIG. 1.

The communication A module 105 is connected to the user/biometric information correspondence management module 110. The communication A module 105 performs communication between the bio-information measurement device 150 and the information processing apparatus 100 via the communication link 145. The communication link 145 may be a wireless line, a wired line, or a combination thereof. However, since it is assumed that a user wearing the bio-information measurement device 150 and a user using the information processing apparatus 100 are the same person, there is no problem as long as the communication link 145 can perform so-called short distance communication. For example, Bluetooth (registered trademark) or Wi-Fi (registered trademark) may be used.

The user/biometric information correspondence management module 110 includes an addition module 115 and a detection module 120, and is connected to the communication A module 105 and the communication B module 125. The user/biometric information correspondence management module 110 adds information for identifying a user of the information processing apparatus 100 to information received by the communication A module 105 from the bio-information measurement device 150, and detects that the user wearing the bio-information measurement device 150 is changed.

The addition module 115 enables communication between the bio-information measurement device 150 and the information processing apparatus 100, and adds information specifying an individual who is using the information processing apparatus 100 to information measured by the bio-information measurement device 150.

The term "information measured by the bio-information measurement device 150" includes, for example, brainwave information, temperature information, pulse information, heart rate information, and blood pressure information, of the user wearing the bio-information measurement device 150. In addition, the term "information specifying an individual" may indicate, for example, identification information of the user who is using the information processing apparatus 100, identification information of the information processing apparatus 100, or identification information of calibration information described later (in particular, calibration ID described later).

The detection module 120 detects that the user wearing the bio-information measurement device 150 is changed using the information measured by the bio-information measurement device 150 after establishing a connection for enabling communication between the bio-information measurement device 150 and the information processing apparatus 100.

In a case where the user (subject) is replaced by the other user after starting the measurement by the bio-information measurement device 150, reliability of the biometric information cannot be maintained.

Therefore, it is required to detect that the user wearing the bio-information measurement device 150 is changed.

The term "connection for enabling communication" means performing mutual authentication between two devices (the bio-information measurement device 150 and the information processing apparatus 100 in this exemplary embodiment), corresponding to, for example, pairing in short distance wireless communication such as Bluetooth.

Further, processing by the detection module 120 may be performed in a case where the bio-information measurement device 150 is attached or detached.

It may be determined whether "the bio-information measurement device 150 is attached or detached" using at least one of inclination of the bio-information measurement device 150, power on/off of the bio-information measurement device 150, communication disconnection between the bio-information measurement device 150 and the information processing apparatus 100, no transmission from the bio-information measurement device 150, or cease operation by the user in the bio-information measurement device 150.

It may be determined whether or not there is "no transmission from the bio-information measurement device 150" by determining, for example, whether or not a period without transmission from the bio-information measurement device 150 is equal to or longer than a predetermined period.

The detection module 120 detects that the user is changed based on brainwave information generated in a case where the user views the image or listens to the sound output by the information processing apparatus 100.

The term "view or listen to" obviously indicate either or both of "viewing" and "listening to".

The detection module 120 may also include an image or a sound registered by the user as the image or the sound. In particular, the image or the sound stored in the information processing apparatus 100 may be used.

Moreover, the detection module 120 detects that the user is changed by comparing previously measured brainwave information of the user with brainwave information measured by the bio-information measurement device 150.

As the "previously measured brainwave information of the user" may be brainwave information generated in a case where the user views an image or listens to a sound output by the information processing apparatus 100 after establishing a connection for enabling communication between the bio-information measurement device 150 and the information processing apparatus 100.

The term "after establishing a connection for enabling communication between the bio-information measurement device 150 and the information processing apparatus 100" indicates, for example, the measurement immediately after pairing between the bio-information measurement device 150 and the information processing apparatus 100 is established, because the biometric information is obviously information of the user since the information processing apparatus 100 used by the user is used during the pairing processing and thus high reliability is expected.

The communication B module 125 is connected to the user/biometric information correspondence management module 110. The communication B module 125 performs communication between the bio-information processing apparatus 180 and the information processing apparatus 100 via the communication link 175. The communication link 175 may be, for example, a wireless line, a wired line, or a combination thereof, and may be, for example, a mobile phone line, internet or intranet, as a communication infrastructure, or the like.

The bio-information measurement device 150 is connected to the information processing apparatus 100 via the communication link 145. The bio-information measurement device 150 is worn by the user and measures the biometric information of the user. The bio-information measurement device 150 measures the biometric information under the assumption that the user is a user who is using the information processing apparatus 100. However, the user may be replaced by the other user, thus the biometric information of the original user cannot be measured. It is so-called spoofing. The information processing apparatus 100 detects this spoofing.

The bio-information processing apparatus 180 is connected to the information processing apparatus 100 via the communication link 175. The bio-information processing apparatus 180 receives the biometric information measured by the bio-information measurement device 150 from the information processing apparatus 100, and stores and sets such biometric information as a processing target. For example, concentration degree of the user wearing the bio-information measurement device 150 is determined.

Figure 2:
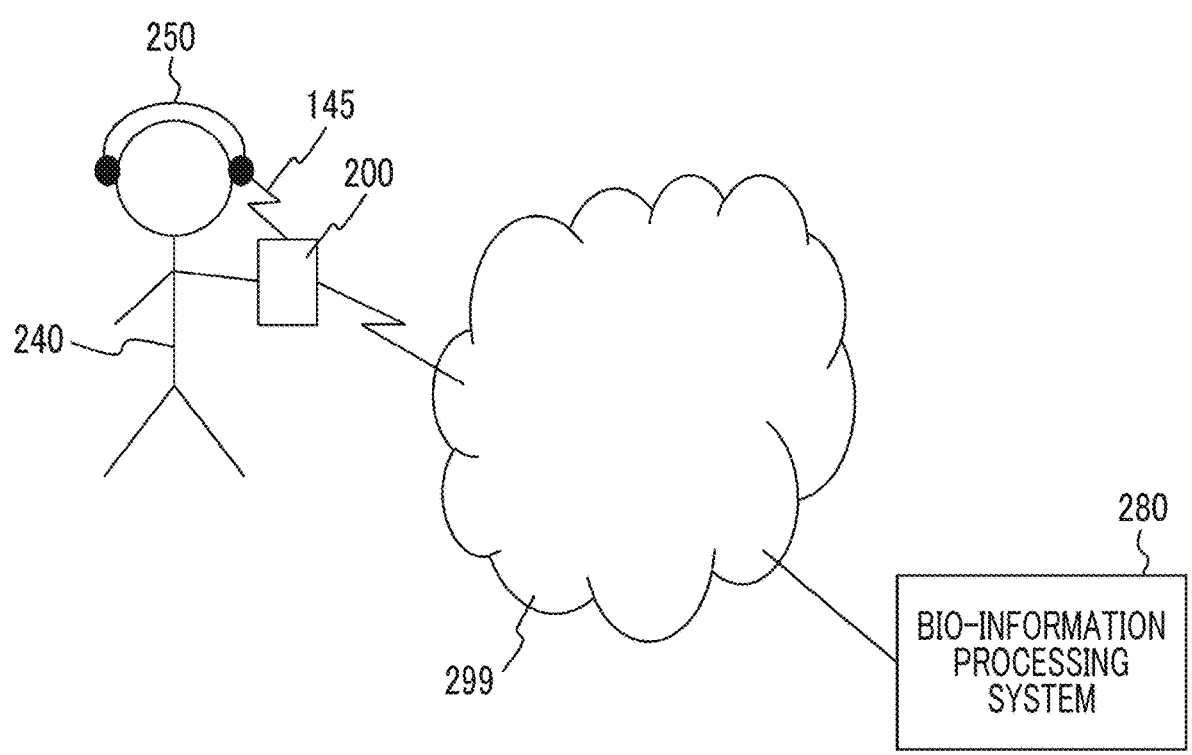
FIG. 2 is a diagram illustrating a configuration example of a system using this exemplary embodiment.

FIG. 2 is a diagram illustrating a configuration example of a system using this exemplary embodiment. A specific example of the information processing apparatus 100 will be shown.

A portable information processing apparatus 200 has a function of the information processing apparatus 100, a wearable device 250 has a function of the bio-information measurement device 150, and a bio-information processing system 280 has a function of the bio-information processing apparatus 180. The portable information processing apparatus 200 and the wearable device 250 are connected via the communication link 145. The portable information processing apparatus 200 and the bio-information processing system 280 are connected via a communication link 299. The communication link 299 corresponds to the communication link 175 illustrated in FIG. 1. Further, the function of the bio-information processing system 280 may be realized as a cloud service. For example, the portable information processing apparatus 200 corresponds to a smartphone or the like.

A user 240 wears the wearable device 250 and carries the portable information processing apparatus 200. The wearable device 250 measures the brainwave of the user 240. The portable information processing apparatus 200 receives the brainwave information measured by the wearable device 250, adds information specifying the user 240 to the brainwave information, and transmits such information to the bio-information processing system 280.

In the example of FIG. 2, the user 240 wears one wearable device 250 only, but may wear a plurality of wearable devices 250. In this case, the portable information processing apparatus 200 receives the biometric information from the plurality of wearable device 250, adds information specifying the user 240 to the brainwave information, and transmits such information to the bio-information processing system 280. The portable information processing apparatus 200 serves as an edge device in a field of so-called IoT (Internet-of-Things), which is a point for transmitting biometric data measured by the wearable device 250 to the bio-information processing system 280.

Figure 3:
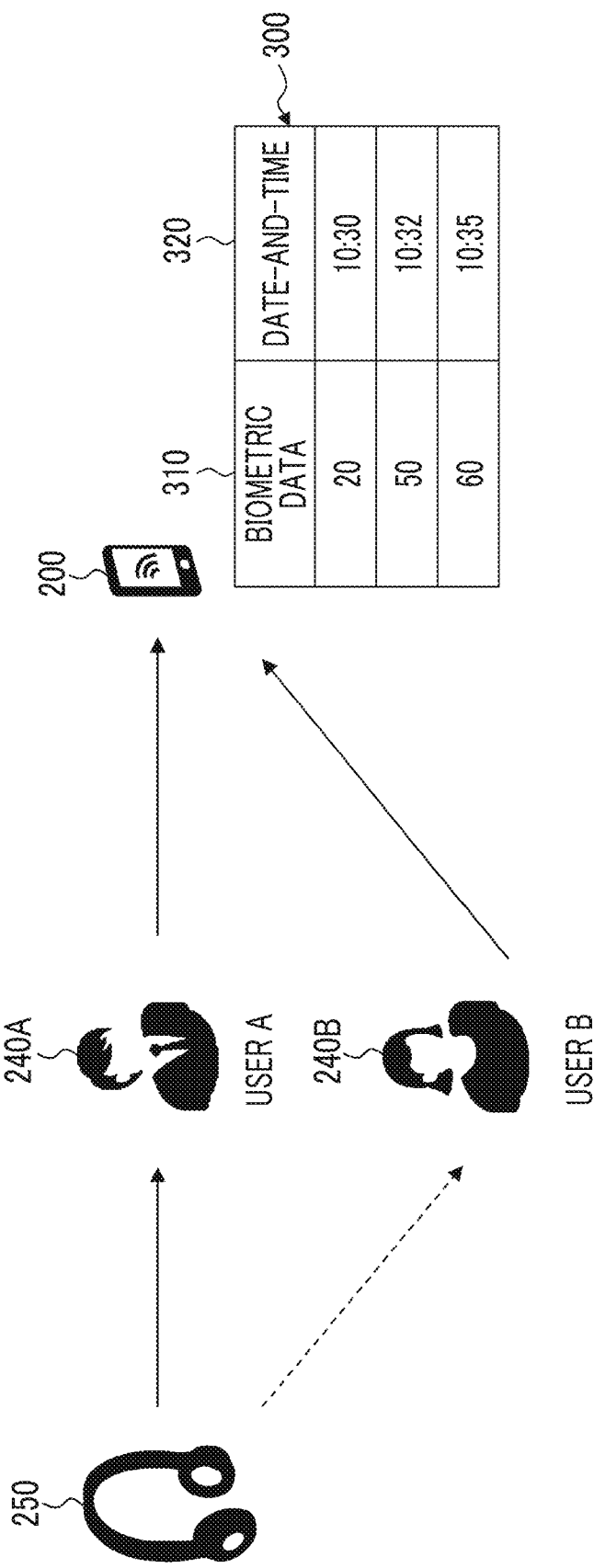
FIG. 3 is a diagram illustrating a problem example of a case where the other user wears a wearable device.

FIG. 3 is a diagram illustrating a problem example of a case where the other user wears the wearable device 250.

In a case where the biometric information is acquired from the wearable device 250, it may not be clear whether or not the biometric data is the biometric information of the user him/herself. As shown in the example of FIG. 3, in a case where the user A: 240A carrying the portable information processing apparatus 200 wears the wearable device 250 and the biometric information measured by the wearable device 250 is transmitted to the bio-information processing system 280, it is impossible to know that such information is whose biometric information. For example, a biometric data table 300 illustrated in FIG. 3 has a biometric data field 310 and a date-and-time field 320. The biometric data field 310 stores the biometric data. The date-and-time field 320 stores date and time at when the biometric data is acquired (the term "date and time" may include year, month, day, hour, minute, second, millisecond, or a combination thereof). In this data structure, it may not be clear whether or not the biometric data is the biometric information of the user him/herself.

Therefore, the portable information processing apparatus 200 adds information indicating that the user A: 240A is an owner of the portable information processing apparatus 200 to the biometric information and transmits such information to the bio-information processing system 280.

Furthermore, it can be assumed that the user A: 240A initially wears the wearable device 250 but removes the wearable device 250, and then the user B: 240B wears the wearable device 250. Since the portable information processing apparatus 200 is already paired with the wearable device 250, the portable information processing apparatus 200 adds the information indicating that the user A: 240A wears the wearable device 250 to the biometric information despite the biometric information belongs to the user B: 240B, and transmits such information to the bio-information processing system 280. In other word, spoofing is available. For example, although the information indicating that the user A: 240A wears the wearable device 250 is added in the biometric data table 300 illustrated in FIG. 3, it is not clear whether or not the biometric data is actually the biometric information of the user A: 240A. There are various techniques such as blockchain, signature, time stamp or the like, in order to determine whether the acquired biometric information is falsified or not. However, these techniques cannot confirm whether the acquired biometric information is actually correct data, that is, the biometric information of the user A: 240A in the example of FIG. 3.

Therefore, the portable information processing apparatus 200 detects that the user wearing the wearable device 250 is changed using the information measured by the wearable device 250.

Figure 4:
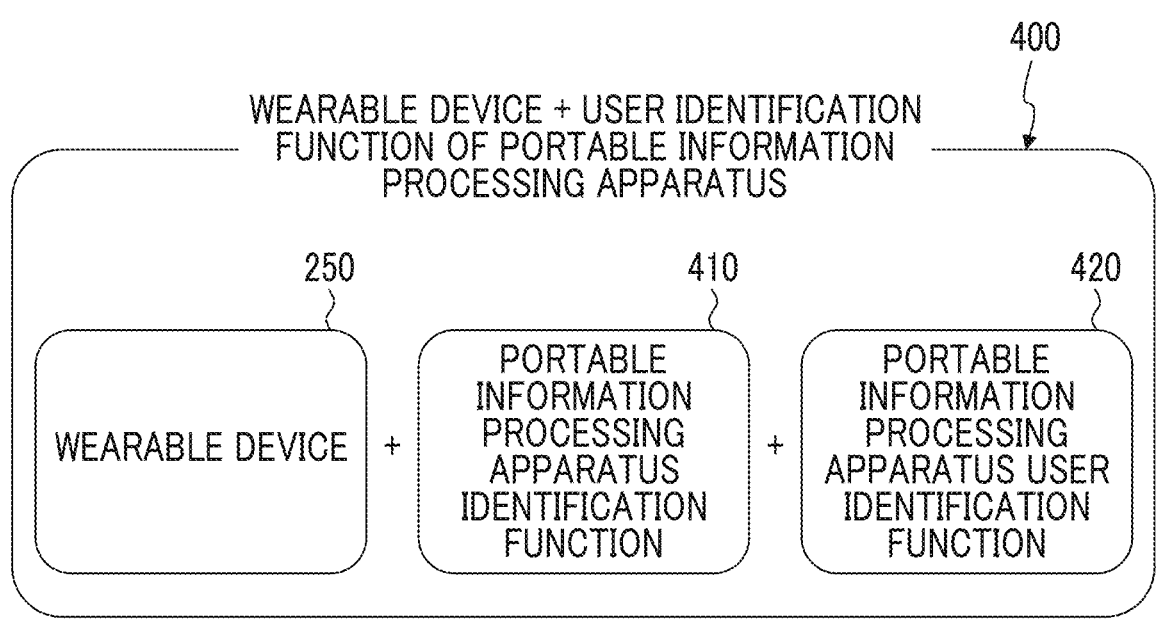
FIG. 4 is a diagram illustrating a function example of this exemplary embodiment.

FIG. 4 is a diagram illustrating a function example of this exemplary embodiment. This diagram is a conceptual explanation of the functions of this exemplary embodiment.

A user identification function 400 of the wearable device and the portable information processing apparatus is realized by the wearable device 250, a portable information processing apparatus authentication function 410, and a portable information processing apparatus user identification function 420.

The wearable device 250 acquires the biometric information, such as brainwave, heart rate, pulse, or the like.

The portable information processing apparatus authentication function 410 indicates a standard function provided by the general portable information processing apparatus 200. For example, it encompasses face authentication, fingerprint authentication, authentication by passphrase, and the like. Further, the portable information processing apparatus 200 has a function of connecting to the wearable device 250 via, for example, Bluetooth.

The portable information processing apparatus user identification function 420 is a function mainly performed by the user/biometric information correspondence management module 110. For example, the following functions are exemplified. (1) A function of adding the information specifying the user of the portable information processing apparatus 200 to the biometric information acquired from the wearable device 250. (2) A function of identifying a feature amount from the biometric information. In a case where the biometric information is the brainwave, the feature amount encompasses, for example, frequency, integrated values for each frequency (such as αwave, β, wave or the like), spectrum analysis result by Fourier transform, etc. (3) A function of determining whether the wearable device 250 is attached or detached. (4) A function of calibrating the wearable device 250. (5) A function of managing the portable information processing apparatus 200 associated with the wearable device 250 in association (the term "associated" is equivalent to the term "linked").

The user identification function 400 of the wearable device and the portable information processing apparatus provides a mechanism capable of specifying the user based on situation including user operation and biometric information, and of managing data for each user wearing the wearable device 250, by means of the wearable device 250, the portable information processing apparatus authentication function 410 and the portable information processing apparatus user identification function 420.

Figure 5:
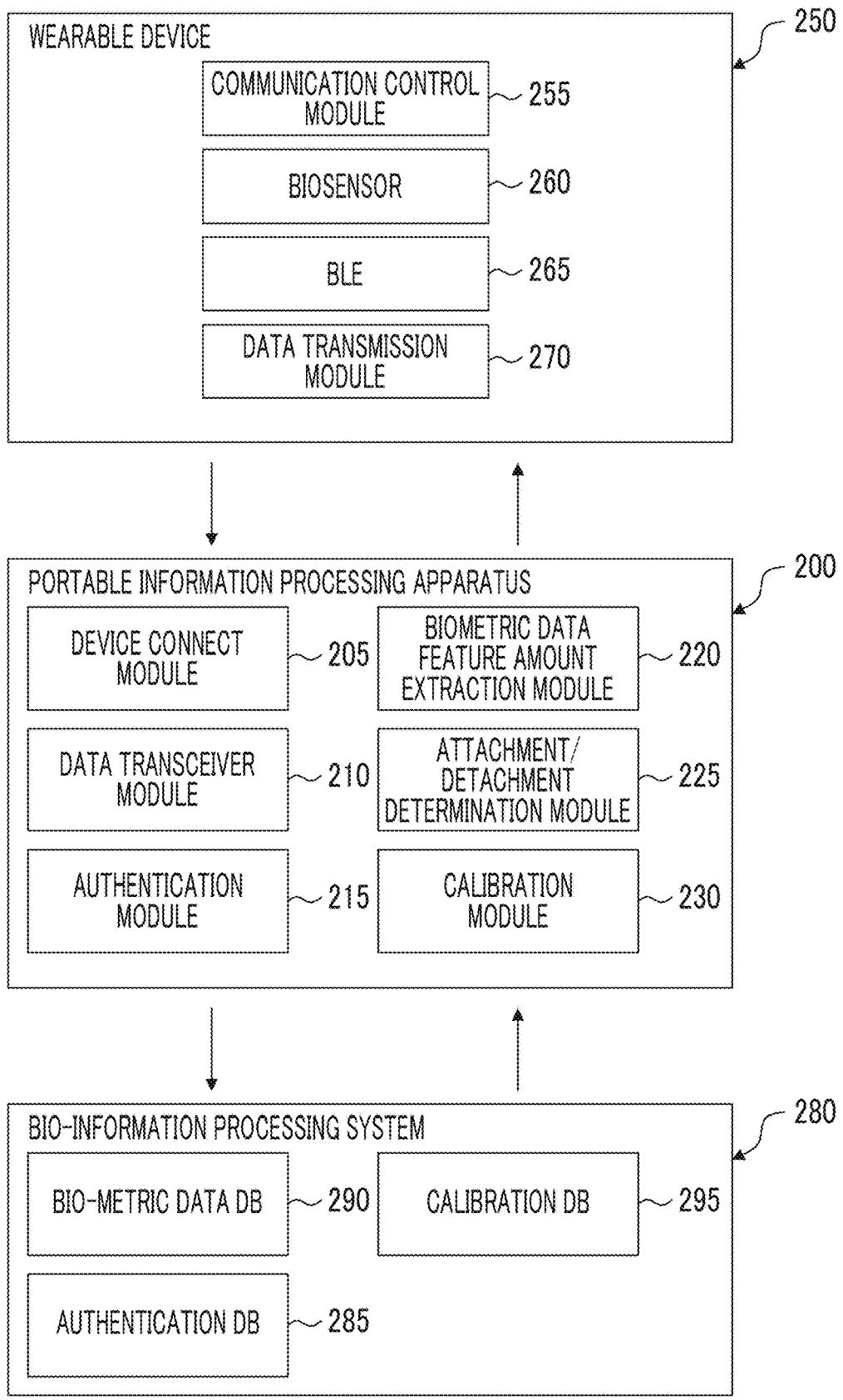
FIG. 5 is a specific module configuration diagram illustrating a configuration example according to this exemplary embodiment.

FIG. 5 is a specific module configuration diagram illustrating a configuration example according to this exemplary embodiment.

The portable information processing apparatus 200 includes a device connection module 205, a data transceiver module 210, an authentication module 215, a biometric data feature amount extraction module 220, an attachment/detachment determination module 225, and a calibration module 230, and is connected to the wearable device 250 via the communication link 145 and to the bio-information processing system 280 via the communication link 175.

The device connection module 205 communicates with the wearable device 250, and receives the biometric information measured by the wearable device 250.

The data transceiver module 210 communicates with the bio-information processing system 280, and transmits the biometric information measured by the wearable device 250.

The authentication module 215 authenticates the user of the portable information processing apparatus 200 using, for example, a fingerprint or a face image.

The biometric data feature amount extraction module 220 extracts feature amounts of the biometric information measured by the wearable device 250. As described above, in a case where the biometric information is the brainwave, the extracted feature amount encompasses, for example, frequency, integrated values for each frequency (such as αwave, β wave or the like), spectrum analysis result by Fourier transform, etc.

The attachment/detachment determination module 225 determines whether the wearable device 250 is attached onto or detached from the user, or whether the connection between the portable information processing apparatus 200 and the wearable device 250 are established or cut-off.

The calibration module 230 performs a calibration processing of the biometric information measured by the wearable device 250. The calibration processing is used, of course, for adjusting the wearable device 250, but is also used for determining whether the same user wears the wearable device 250 or not. In particular, the calibration processing is performed immediately after the wearable device 250 is attached onto the user. A result of the calibration processing is stored. In a case where it is likely that the wearable device 250 is attached onto or detached from the user, it is determined whether or not the user currently wearing wearable device 250 is the same as the user who is designated as a target of the calibration processing using such a result.

The wearable device 250 includes a communication control module 255, a biosensor 260, a BLE 265, and a data transmission module 270, and is connected to the portable information processing apparatus 200 via the communication link 145.

The communication control module 255 controls to transmit the biometric information measured by the biosensor 260 to the portable information processing apparatus 200 using the BLE 265 and the data transmission module 270.

The biosensor 260 measures the biometric information such as the brainwave of a person wearing the wearable device 250.

The BLE 265 communicates with the portable information processing apparatus 200 using Bluetooth Low Energy which has a low power consumption communication mode.

The data transmission module 270 transmits the biometric information measured by the biosensor 260 to the portable information processing apparatus 200 using the BLE 265 in accordance with the control of the communication control module 255.

The bio-information processing system 280 includes an authentication DB 285, a biometric data DB 290, and a calibration DB 295, and is connected to the portable information processing apparatus 200 via the communication link 175.

The authentication DB 285 stores authentication information in the bio-information processing system 280. For example, correspondence between the identification information of the portable information processing apparatus 200 and the identification information of the user is stored in the authentication DB.

The biometric data DB 290 stores the biometric information transmitted from the portable information processing apparatus 200.

The calibration DB 295 stores calibration information transmitted from the portable information processing apparatus 200.

For example, the portable information processing apparatus 200 performs a processing as follows.

The identification information of the user who is using the portable information processing apparatus 200 is added to the biometric information acquired from the wearable device 250, by means of the authentication function of the portable information processing apparatus 200. Furthermore, the biometric information may be labeled by identification information of the calibration information to ensure reliability of the biometric information. For preventing spoofing, in a case where the wearable device 250 is attached onto or detached from the user, or where the acquired biometric information has an interval equal to or longer than a predetermined time, the calibration information is compared with the biometric information. In a case where values are remarkably different upon comparing, the user is guided to the calibration function, and the current calibration result and the first calibration result are compared to determine whether the user has been changed or not.

Figure 6:
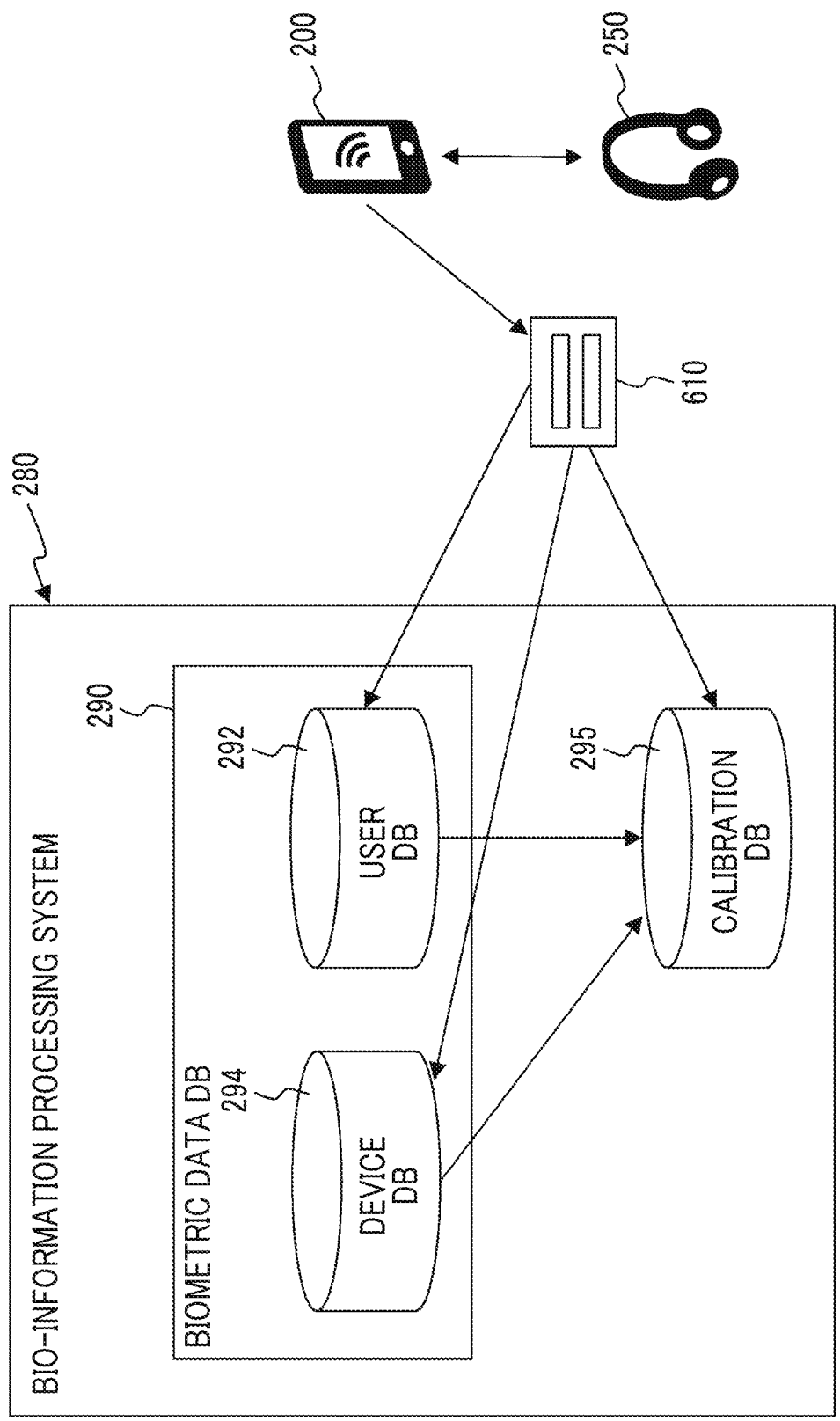
FIG. 6 is a diagram illustrating a processing example of this exemplary embodiment.

FIG. 6 is a diagram illustrating a processing example of this exemplary embodiment.

The bio-information processing system 280 includes the biometric data DB 290 and the calibration DB 295. The biometric data DB 290 has a user DB 292 and a device DB 294.

For example, the portable information processing apparatus 200 specifies the user by biometric authentication.

The portable information processing apparatus 200 and the wearable device 250 perform the pairing first, and pairing information of each other are registered.

The portable information processing apparatus 200 generates correspondence data of the user and the portable information processing apparatus 200 used by such a user in the user DB 292 using a biometric information collection application 610. As the correspondence data, for example, the user/portable information processing apparatus correspondence table 700 is generated. FIG. 7 is a diagram illustrating an example of a data structure of the user/portable information processing apparatus correspondence table 700. The user/portable information processing apparatus correspondence table 700 has a user ID field 710 and a portable information processing apparatus ID field 720. In this exemplary embodiment, the user ID field 710 stores information (in particular, user ID: identification) for uniquely identifying the user. The portable information processing apparatus ID field 720 stores information (in particular, portable information processing apparatus ID field) for uniquely identifying the portable information processing apparatus 200 in this exemplary embodiment. In the example of FIG. 7, the user A uses a smartphone A and the user B uses a smartphone B.

The portable information processing apparatus 200 generates correspondence data of the portable information processing apparatus 200 and the wearable device 250 paired with such a portable information processing apparatus 200 in the device DB 294 using the biometric information collection application 610. As the correspondence data, for example, a portable information processing apparatus/device correspondence table 800 is generated. FIG. 8 is a diagram illustrating an example of a data structure of the portable information processing apparatus/device correspondence table 800. The portable information processing apparatus/device correspondence table 800 has a portable information processing apparatus ID field 810 and a device ID field 820. The portable information processing apparatus ID field 810 stores a portable information processing apparatus ID. The device ID field 820 stores information (device ID) for uniquely identifying the device in this exemplary embodiment. In the example of FIG. 8, the smartphone A and a device 1 are paired, and the smartphone B and a device 2 are paired.

The portable information processing apparatus 200 generates the calibration information in the calibration DB 295 using the biometric information collection application 610. In a case where the wearable device 250 is first used, the biometric information is measured under a predetermined condition and used as the calibration information. The detailed method of generating the calibration information will be described later with reference to FIG. 15 and other diagrams. For example, the calibration management table 900 is generated by generating the calibration information. FIG. 9 is a diagram illustrating an example of a data structure of the calibration management table 900.

The calibration management table 900 includes a calibration ID field 910, a user ID field 920, a portable information processing apparatus ID field 930, a device ID field 940, a date-and-time field 950, and a calibration value field 960. The calibration ID field 910 stores information (calibration ID) for uniquely identifying calibration in this exemplary embodiment. The user ID field 920 stores a user ID. The portable information processing apparatus ID field 930 stores a portable information processing apparatus ID. The device ID field 940 stores a device ID. The date-and-time field 950 stores a date and a time. The calibration value field 960 stores a calibration value. In other words, the biometric information of the user is measured using the portable information processing apparatus 200 and the wearable device 250. A situation under which the biometric information is measured is stored in the user ID field 920, the portable information processing apparatus ID field 930, the device ID field 940, and the date-and-time field 950, while a measured value is stored in the calibration value field 960. In the example of FIG. 9, the biometric information of the user A is stored as a result measured with the smartphone A and the device 1 at a date and a time "Y1, M1, H1, M1" as a calibration ID: R1. The biometric information of the user B is stored as a result measured with the smartphone B and the device 2 at a date and a time "Y2, M2, H2, M2" as a calibration ID: R2.

The biometric information of the user is measured, the feature amounts of the biometric information and the calibration information are collated, and the calibration ID that matches the biometric information is added to the biometric information.

Figure 10:
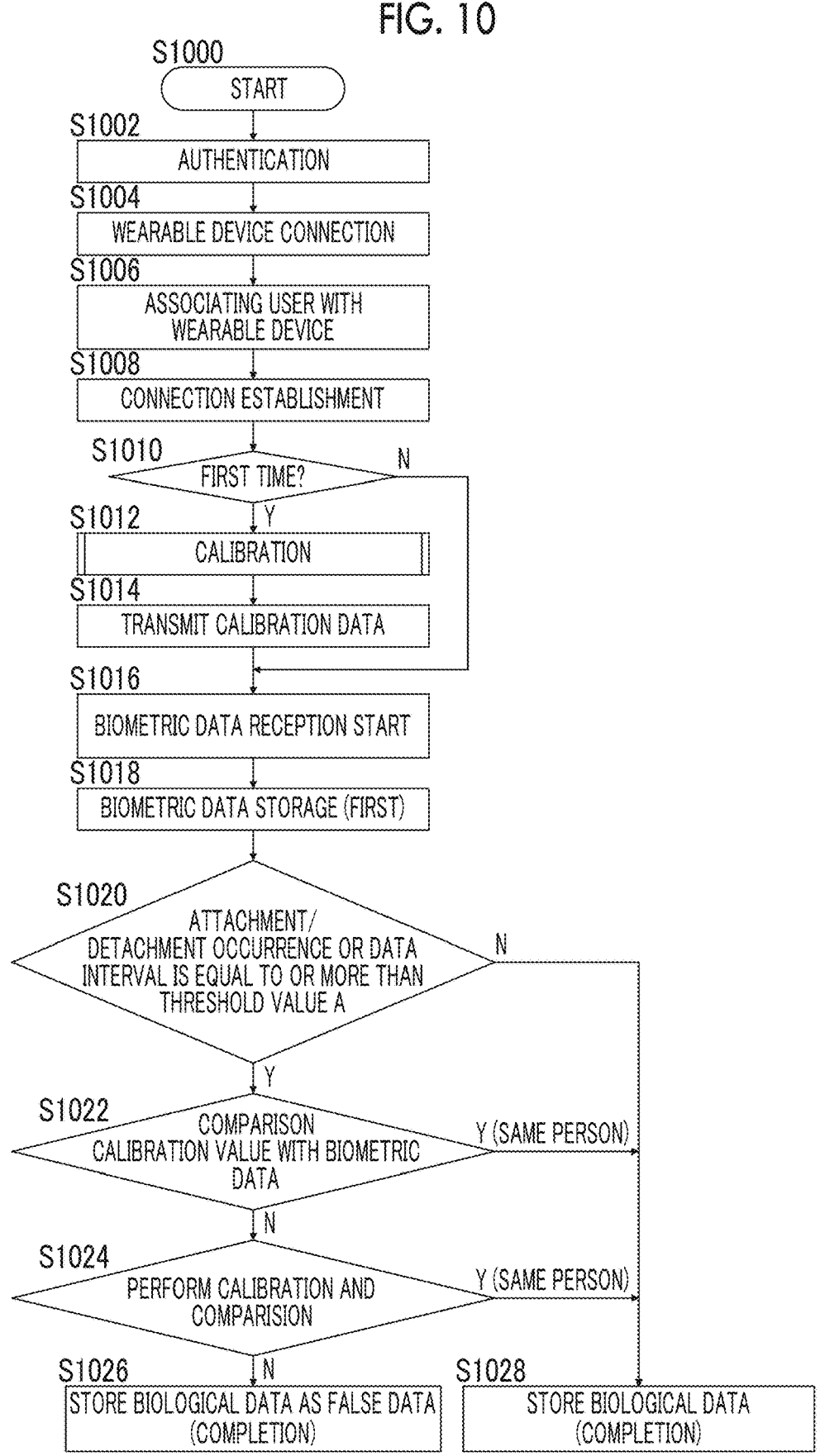
FIG. 10 is a flowchart illustrating a processing example of this exemplary embodiment.

FIG. 10 is a flowchart illustrating a processing example of this exemplary embodiment. A processing illustrated in the example of FIG. 10 is a processing mainly performed by the portable information processing apparatus 200.

In step S1002, the user is authenticated.

In step S1004, the portable information processing apparatus 200 and the wearable device 250 are connected.

In step S1006, the user is associated with the wearable device 250. That is, the identification information of the wearable device 250 is associated with the identification information of the user.

In step S1008, the connection between the portable information processing apparatus 200 and the wearable device 250 is established.

In step S1010, it is determined whether it is the first time or not. In a case where it is the first time, the processing proceeds to step S1012, and otherwise, the processing proceeds to step S1016.

In step S1012, the calibration is performed. The detailed processing of step S1012 will be described later using a flowchart illustrated in the example of FIG. 15.

In step S1014, the calibration data is transmitted to the bio-information processing system 280.

In step S1016, the biometric data is received from the wearable device 250. The portable information processing apparatus 200 receives the biometric data from the wearable device 250, and generates, for example, a biometric data table 1100. FIG. 11 is a diagram illustrating an example of a data structure of the biometric data table 1100. The biometric data table 1100 has a device ID field 1110, a date-and-time field 1120, and a biometric data field 1130. The device ID field 1110 stores a device ID. The date-and-time field 1120 stores a date and a time when the biometric data has been acquired. The biometric data field 1130 stores the biometric data.

In step S1018, the biometric data is stored in the portable information processing apparatus 200. The biometric data is temporarily stored until it is transmitted to the bio-information processing system 280.

Steps S1020 to S1024 are processing of spoofing determination.

In step S1020, it is determined whether "the wearable device 250 is attached onto or detached from the user", or whether "the interval occurring during the data acquisition is equal to or longer than a threshold A". In a case where "the wearable device 250 is attached onto or detached from the user", or where "the interval occurring during the data acquisition is equal to or longer than the threshold A", the processing proceeds to step S1022, and otherwise, the processing proceeds to step S1028.

Such a determination is performed using at least one of inclination of the wearable device 250, power on/off of the wearable device 250, communication disconnection of the wearable device 250, no transmission from the wearable device 250, or cease operation by the user in the wearable device 250. Regarding "inclination of the wearable device 250", for example, in a case where the wearable device 250 is kind of a device that is not inclined upon measuring the biometric information but the inclination of the wearable device 250 is detected, it may be determined that the wearable device 250 is attached onto or detached from the user. In a case where the inclination is greater than or equal to a predetermined value, it may be determined that the wearable device 250 is attached onto or detached from the user.

Further, the conditions of "communication disconnection of the wearable device 250" and "no transmission from wearable device 250" may be replaced with a condition of "the interval occurring during the data acquisition is equal to or longer than the threshold A".

In step S1022, a calibration value is compared with the biometric data, and in a case where the user is the same person (Y), the processing proceeds to step S1028, and otherwise (N), the processing proceeds to step S1024.

The calibration value is the biometric information measured in step S1012. As described above, the calibration value is the biometric information measured in a predetermined situation. In a case where the feature amount of this calibration information and the feature amount of the biometric information acquired in step S1016 do not match, it is highly suspected to be spoofing. As a matter of course, in a case where they match, it is determined that the biometric information is acquired from the same user. Further, the term "match(ing)" encompasses a case where a difference between two feature amounts is less than or equal to a predetermined value, as well as perfect matching.

In step S1024, the calibration and the comparison are performed, and in a case where the user is the same person (Y), the processing proceeds to step S1028, and otherwise (N), the processing proceeds to step S1026. That is, in a case where the same processing as step S1012 is performed and the feature amount of the calibration information acquired in step S1026 performed at the first time does not match the feature amount of the calibration information of this time, it is highly suspected to be spoofing. As a matter of course, in a case where they match, it is determined that the biometric information is acquired from the same user.

In step S1026, the biometric data is stored as improper data in the bio-information processing system 280, and the processing is completed. As a matter of course, the biometric data is not considered as the formal biometric data of the target user. For example, a warning processing is performed, such as displaying a screen indicating that the biometric data belongs to a different user.

In step S1028, the biometric data is stored in the bio-information processing system 280, and the processing is completed.

Further, the biometric data transmitted from the portable information processing apparatus 200 to the bio-information processing system 280 may be, for example, a biometric data table 1200, a biometric data table 1300, or a biometric data table 1400.

FIG. 12 is a diagram illustrating an example of a data structure of the biometric data table 1200. The biometric data table 1200 has a user ID field 1210, a device ID field 1220, a date-and-time field 1230, and a biometric data field 1240. The user ID field 1210 stores a user ID. The device ID field 1220 stores a device ID of the wearable device 250 that has measured the biometric data of the user. The date-and-time field 1230 stores a date and a time when the biometric data has been acquired. The biometric data field 1240 stores the biometric data.

Figure 13:
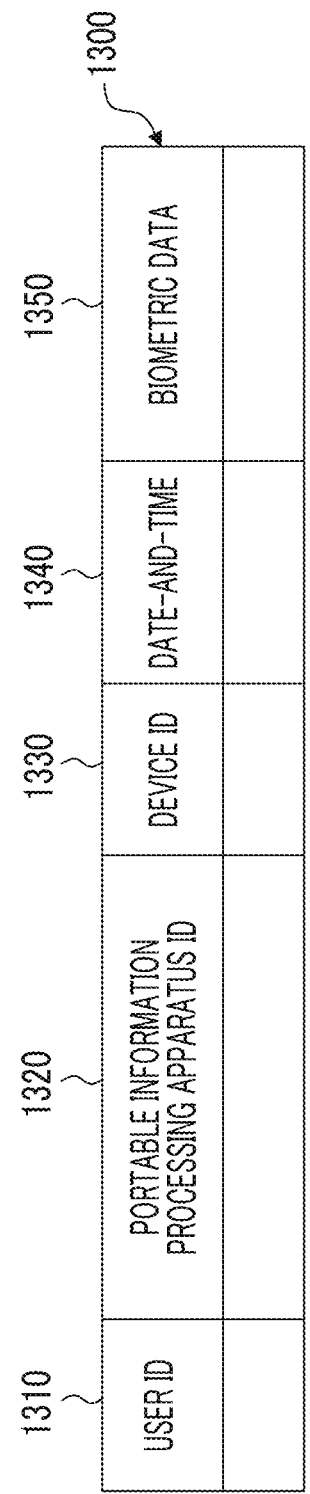
FIG. 13 is a diagram illustrating an example of a data structure of a biometric data table.

The biometric data table 1300 is obtained by adding a portable information processing apparatus ID field 1320 to the biometric data table 1200. FIG. 13 is a diagram illustrating an example of a data structure of the biometric data table 1300. The biometric data table 1300 has a user ID field 1310, a portable information processing apparatus ID field 1320, a device ID field 1330, a date-and-time field 1340, and a biometric data field 1350. The user ID field 1310 stores a user ID. The portable information processing apparatus ID field 1320 stores a portable information processing apparatus ID of the portable information processing apparatus 200 used by the user. The device ID field 1330 stores a device ID. The date-and-time field 1340 stores a date and a time. The biometric data field 1350 stores the biometric data.

Figure 14:
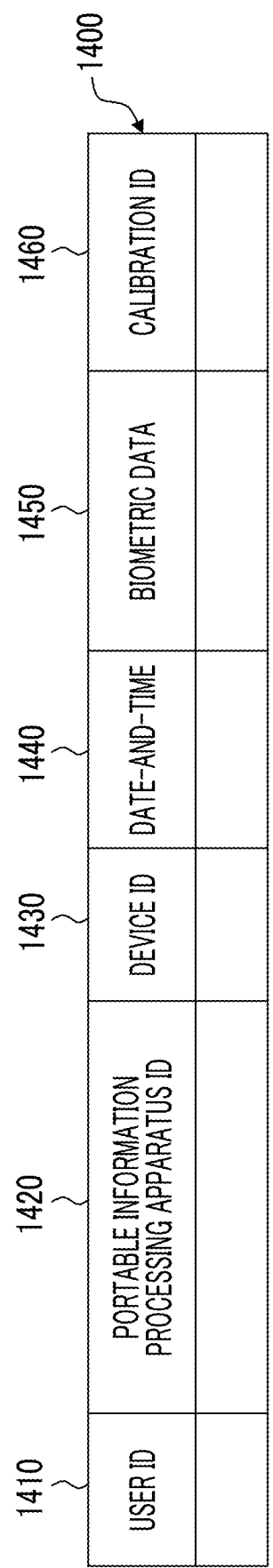
FIG. 14 is a diagram illustrating an example of a data structure of a biometric data table.

The biometric data table 1400 is obtained by adding a calibration ID field 1460 to the biometric data table 1300. FIG. 14 is a diagram illustrating an example of a data structure of the biometric data table 1400. The biometric data table 1400 has a user ID field 1410, a portable information processing apparatus ID field 1420, a device ID field 1430, a date-and-time field 1440, a biometric data field 1450, and a calibration ID field 1460. The user ID field 1410 stores a user ID. The portable information processing apparatus ID field 1420 stores a portable information processing apparatus ID. The device ID field 1430 stores a device ID. The date-and-time field 1440 stores a date and a time. The biometric data field 1450 stores the biometric data. The calibration ID field 1460 stores a calibration ID. In particular, the calibration ID of the calibration information that matches the biometric data in the biometric data field 1450 is stored. The calibration ID is managed by the calibration management table 900, and the user can be extracted from the calibration ID. The biometric data is likely to be acquired from the user corresponding to the calibration ID.

That is, in a case where the user corresponding to the calibration ID does not match the user stored in the user ID field 1410, it is highly suspected to be spoofing. Moreover, in a case of spoofing, it is likely that the user corresponding to the calibration ID in the calibration management table 900 may have spoofed the original user (here, the user stored in the user ID field 1410). The portable information processing apparatus 200 may determine such spoofing and display a message indicating the spoofing. Consequently, the portable information processing apparatus 200 may acquire the calibration management table 900 from the bio-information processing system 280, and compare the calibration information with each other. As a message to be displayed, for example, a sentence such that "the user wearing the wearable device 250 is Mr. XX, not you" may be used.

Figure 15:
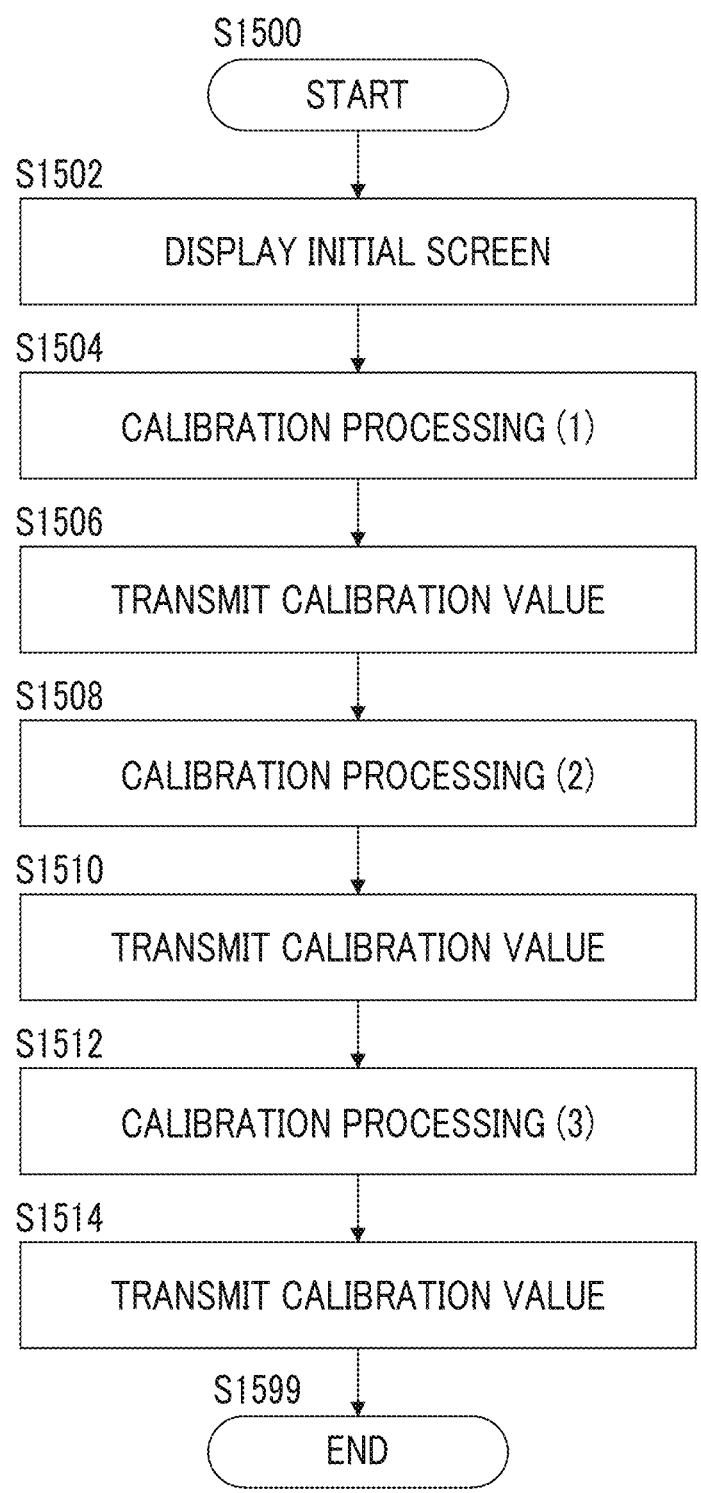
FIG. 15 is a flowchart illustrating a processing example of this exemplary embodiment.

FIG. 15 is a flowchart illustrating a processing example of this exemplary embodiment. A processing illustrated in the example of FIG. 15 is a processing mainly performed by the portable information processing apparatus 200. This processing example is performed in a case where the biometric data is measured at the first time (step S1012), or in a case where it is highly suspected to be spoofing (step S1024).

Figure 16:
FIG. 16 is a diagram illustrating a processing example of this exemplary embodiment.

In step S1502, an initial screen is displayed. For example, a screen 1610 illustrated in FIG. 16 is displayed. FIG. 16 is a diagram illustrating a processing example of this exemplary embodiment. The portable information processing apparatus 200 has the screen 1610. The screen 1610 displays a description of the application. For example, the following sentence is displayed: "Welcome! Your brainwave status will be measured. Please follow the voice instructions to measure the brainwave", in combination with the number of walkthrough screens required for this processing (four circles indicating four pages in the example of FIG. 16). As a matter of course, it may be a description accompanying with drawings and the like.

Figure 17:
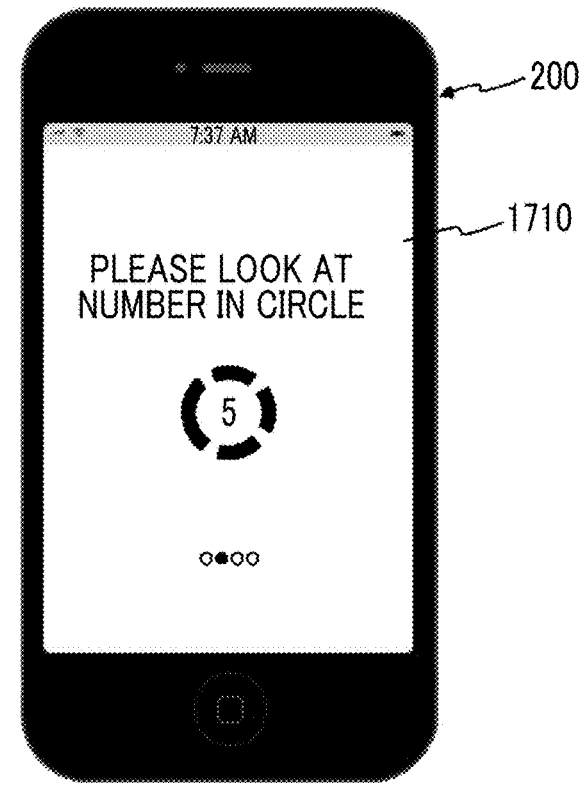
FIG. 17 is a diagram illustrating a processing example of this exemplary embodiment.

In step S1504, a calibration processing (1) is performed. For example, the brainwave is measured while the following instruction is followed by the user: "Open your eyes and stare at a point displayed on the screen for 5 seconds". For example, a screen 1710 illustrated in FIG. is displayed. FIG. 17 is a diagram illustrating a processing example of this exemplary embodiment. The portable information processing apparatus 200 has the screen 1710. For example, the following instruction is displayed on the screen 1710 accompanying with seconds required for such an instruction (5 seconds) and the number of walkthrough screens: "Please stare at a number in a circle". The number at a center of the circle in the screen 1710 is counted down and displayed. Further, the user may be instructed to concentrate by voice.

In step S1506, the brainwave information measured is transmitted to the bio-information processing system 280 as the calibration value.

Figure 18:
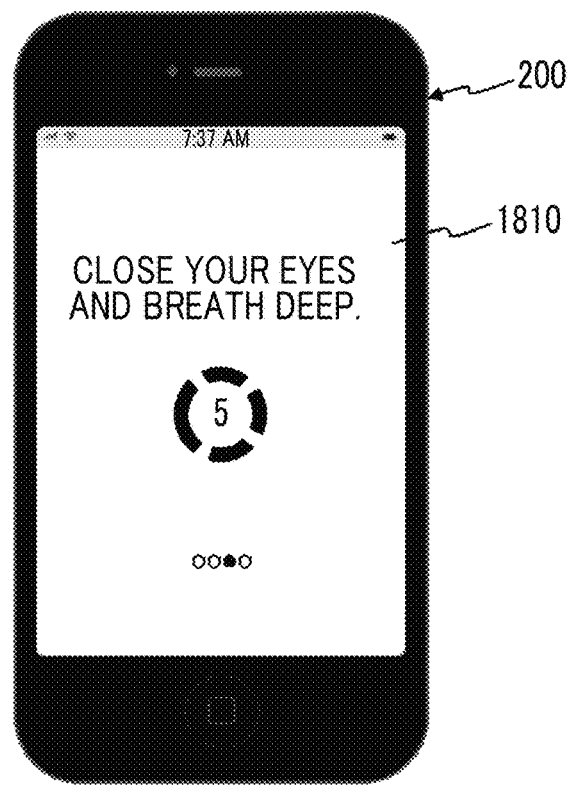
FIG. 18 is a diagram illustrating a processing example of this exemplary embodiment.

In step S1508, a calibration processing (2) is performed. For example, the brainwave is measured while the following instruction is followed by the user: "Close your eyes and listen to music for 5 seconds". For example, a screen 1810 illustrated in FIG. 18 is displayed. FIG. 18 is a diagram illustrating a processing example of this exemplary embodiment. The portable information processing apparatus 200 has the screen 1810. For example, the following instruction is displayed on the screen 1810 accompanying with seconds required for such an instruction (5 seconds) and the number of walkthrough screens: "Close your eyes and take a deep breath". The number at a center of the circle in the screen 1810 is counted down and displayed. For example, relaxing music may be played. Further, the user may be instructed to relax by voice.

In step S1510, the brainwave information measured is transmitted to the bio-information processing system 280 as the calibration value.

Figure 19:
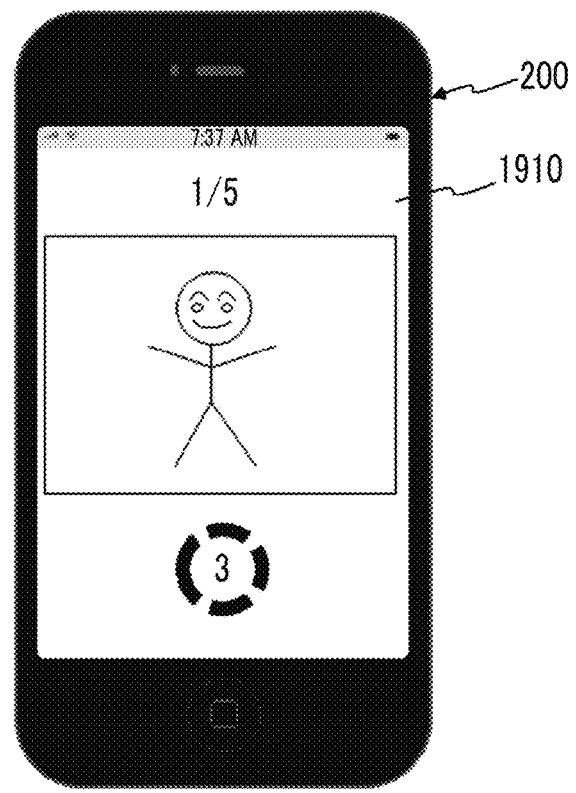
FIG. 19 is a diagram illustrating a processing example of this exemplary embodiment.

In step S1512, a calibration processing (3) is performed. For example, the brainwave is measured while the following instruction is followed by the user: "Open your eyes and confirm five images to be displayed". For example, a screen 1910 illustrated in FIG. 19 is displayed. FIG. 19 is a diagram illustrating a processing example of this exemplary embodiment. The portable information processing apparatus 200 has the screen 1910. For example, a progress of the images (1/5) is displayed on the screen 1910. Reaction to the image displayed on the screen 1910 is measured. For example, the user may follow the following instruction.

First, three images of interest shall be picked up and registered. In particular, images stored in the portable information processing apparatus 200 may be displayed so as to be selectable. Three images selected by the user among them may be registered as images to be displayed in this calibration. For example, the user can pick up images of him/herself, his/her own child, favorite toys and the like as those three images.

The images are displayed five times on the screen 1910 one by one at an interval of 3 seconds. Three images registered by the user and two images prepared in advance are displayed.

Further, the user may be instructed to concentrate by voice.

Moreover, in the calibration at the first time (step S1012), five images are displayed. Provided that, in the "calibration upon determination" (step S1024), the image display may be terminated in a case where the individual is specified. In other words, it is not necessary to show all of five images.

Further, the order to be displayed may be random or may be a predetermined order. In a case where the images are displayed in random order in the calibration at the first time (step S1012), the display order is stored, and the images may be displayed in the display order for calibration at the first time in the calibration upon determination (step S1024).

In step S1514, the brainwave information measured is transmitted to the bio-information processing system 280 as the calibration value.

Figure 20:
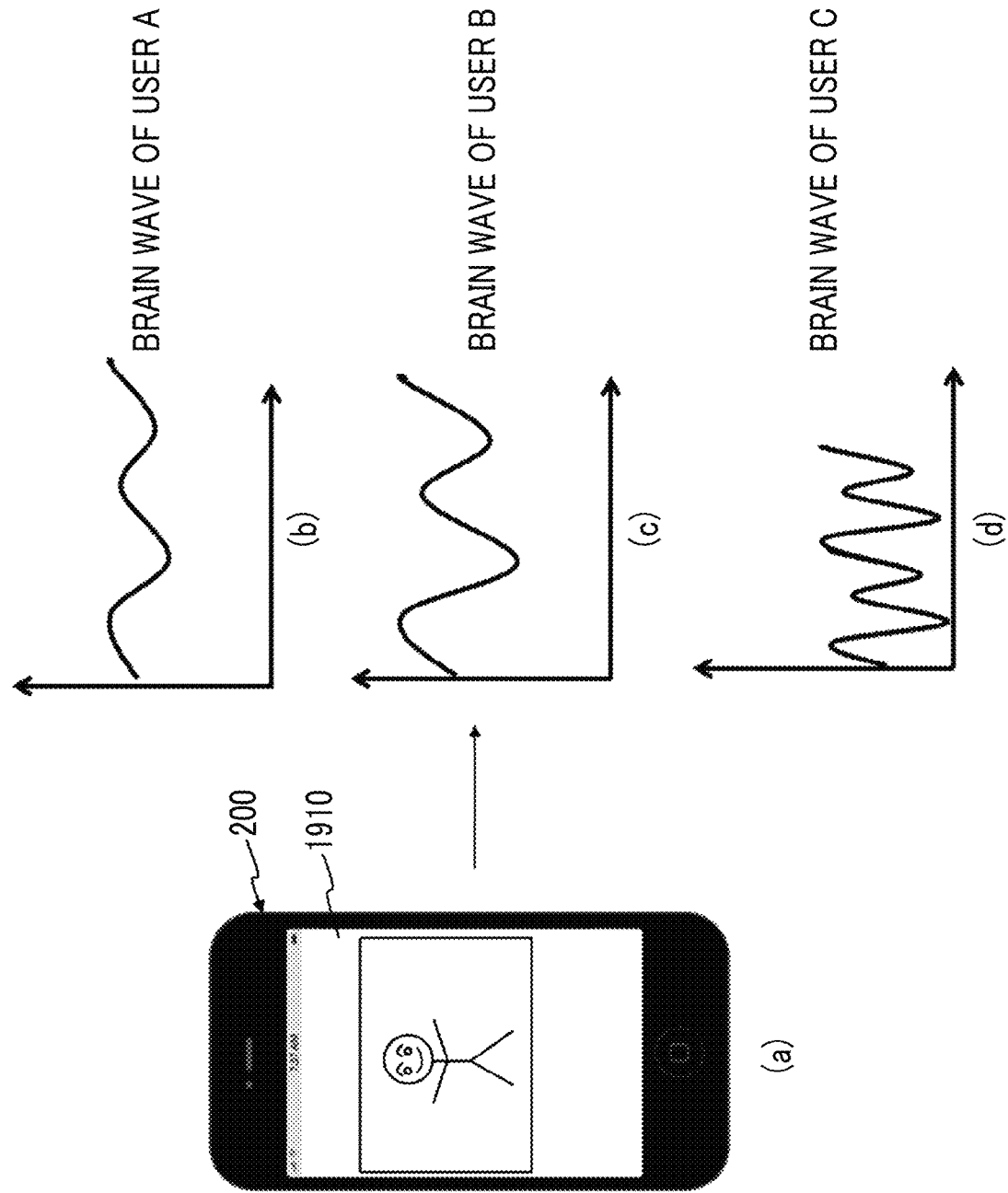
FIG. 20 is a diagram illustrating a processing example of this exemplary embodiment.

Further, as the brainwave response based on visual information such as images or based on auditory information such as music, different waveforms are generated for each subject. For example, even though the same image is displayed on the screen 1910 of the portable information processing apparatus 200 as illustrated in FIG. 20A, the brainwaves of the user A, the user B and the user C are different from each other as illustrated in FIGS. 20B, 20C, and 20D. In step S1022 and step S1024, the user wearing the wearable device 250 is identified using this brainwave response. For example, the following experiment can be referred: "'Individual Authentication' with EEG: Hijacking Prevention is Also Available, experimented by Tottori University" (see https://www.sankei.com/life/news/170818/lif1708180001-n1.html).

Figure 21:
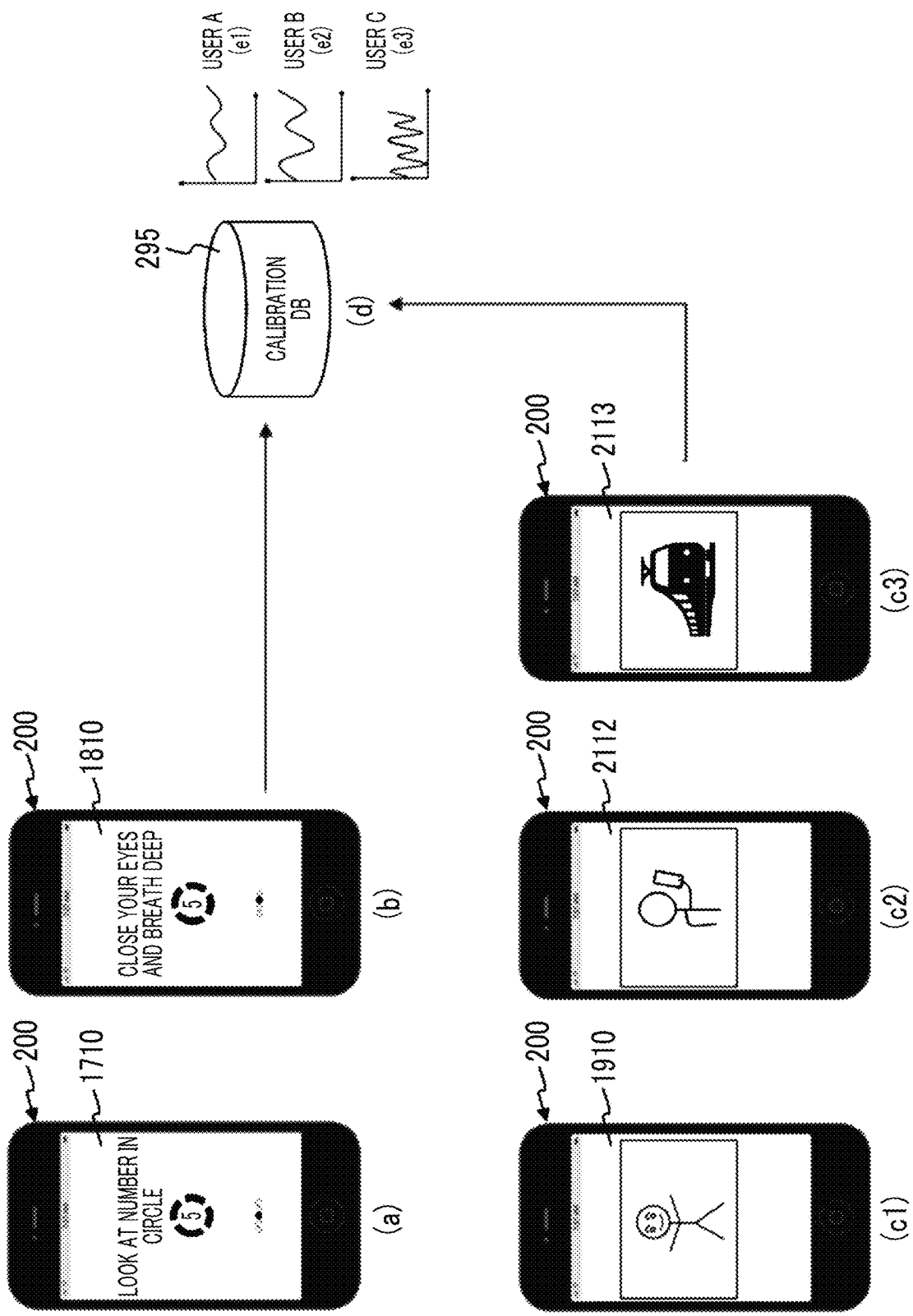
FIG. 21 is a diagram illustrating a processing example of this exemplary embodiment.

FIGS. 21A to 21E3 are diagrams illustrating a processing example of this exemplary embodiment.

The example of FIG. 21A is equivalent to the example of FIG. 17, which shows a case where the brainwave is measured for the user concentrated. The example of FIG. 21B is equivalent to the example of FIG. 18, which shows a case where the brainwave is measured for the user relaxed. The examples of FIGS. 21C1 to 21C3 are equivalent to the example of FIG. 19, which shows a case where the brainwave is measured for the response of the user staring the images displayed. For example, an image of the user's own child is displayed on the screen 1910. An image of the user is displayed on a screen 2112. An image of a train of interest is displayed on a screen 2113. As described above, the other two images prepared in advance are displayed.

As illustrated in the examples of FIGS. 21D and 21E1 to 21E3, the calibration results, which are the measurement results of the brainwave, are stored in the calibration DB 295 of the bio-information processing system 280 for each user.

These calibration results are used in step S1022 or step S1024 of the flowchart illustrated in the example of FIG. 10.

Figure 22:
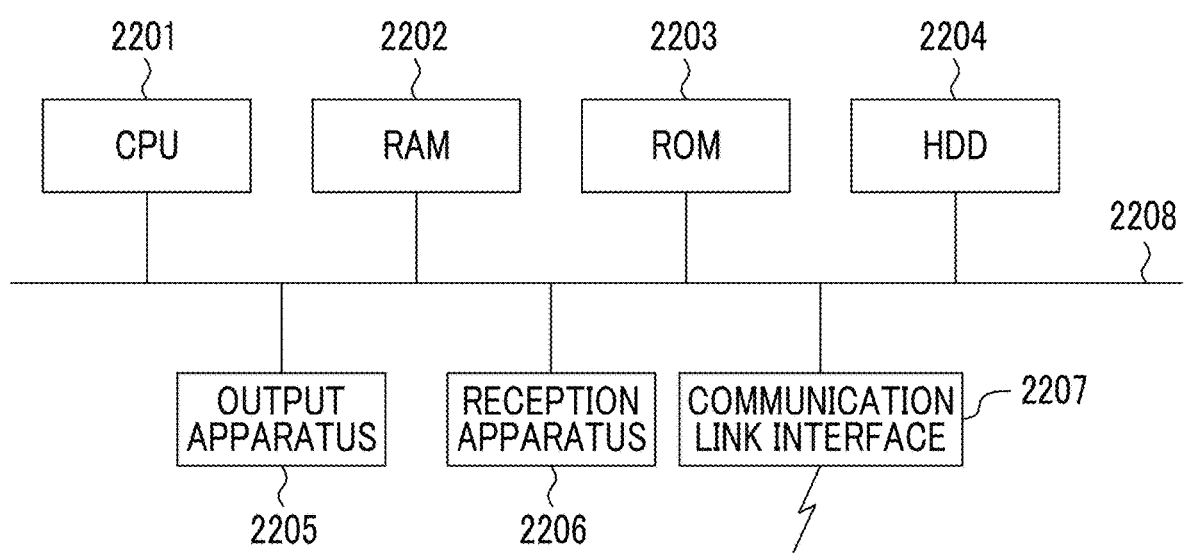
FIG. 22 is a block diagram illustrating a hardware configuration example of a computer for realizing this exemplary embodiment.

Meanwhile, a hardware configuration of a computer executing a program as this exemplary embodiment is a general computer as illustrated in FIG. 22, and specifically, is a personal computer, a computer that may serve as a server, or the like. That is, as a specific example, a CPU 2201 is used as a processing unit (computational unit), and a RAM 2202, a ROM 2203, and an HDD 2204 are used as storage devices. As the HDD 2204, for example, a hard disk or a Solid State Drive (SSD) may be used.

The computer includes the CPU 2201 that executes programs such as the communication A module 105, the addition module 115, the detection module 120, the communication B module 125, the device connection module 205, the data transceiver module 210, the authentication module 215, the biometric data feature amount extraction module 220, the attachment/detachment determination module 225, the calibration module 230, the communication control module 255, the biosensor 260, the BLE 265 and the data transmission module 270, the RAM 2202 that stores the programs and data, the ROM 2203 that stores programs for starting up the computer, and the like, the HDD 2204 which is an auxiliary storage device (may be a flash memory or the like) which functions as the authentication DB 285, the biometric data DB 290, the calibration DB 295, and the like, a reception apparatus 2206 that receives data on the basis of a user's operation (including a motion, a sound, an eye gaze, and the like) with respect to a keyboard, a mouse, a touch screen, a microphone, a camera (including an eye gaze detection camera, and the like), and the like, an output apparatus 2205 such as a CRT, a liquid crystal display, or a speaker, a communication link interface 2207, such as a network interface card, for connection to a communication network, and a bus 2208 for transmitting and receiving data by connecting the above-mentioned components. Plural computers may be connected to each other through a network.

Regarding the exemplary embodiment based on a computer program among the above-described exemplary embodiments, a system having this hardware configuration is caused to read a computer program which is software, and the above-described exemplary embodiment is realized by the cooperation of software and hardware resources.

Meanwhile, a hardware configuration illustrated in FIG. shows one configuration example. This exemplary embodiment is not limited to the configuration illustrated in FIG. 22, and the information processing apparatus may be configured such that the modules described in this exemplary embodiment are capable of being executed. For example, some modules may be constituted by dedicated hardware (for example, an Application Specific Integrated Circuit (ASIC) or a field-programmable gate array (FPGA) the like), some modules may be provided in an external system and connected to each other through a communication link, or plural systems each of which is illustrated in FIG. 22 may be connected to each other through a communication link and operated in cooperation with each other.

In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multifunction machine (an image processing apparatus including any two or more of a scanner, a printer, a copying machine, and a facsimile), and the like, in addition to a personal computer.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Furthermore, the program may be part or all of another program, or may be recorded on a recording medium together with a separate program. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor, being configured to: enable communication between a bio-information measurement device and the information processing apparatus, add information specifying an individual who is using the information processing apparatus to information measured by the bio-information measurement device, and
    detect that a user wearing the bio-information measurement device is changed using the information measured by the bio-information measurement device with the added information specifying the individual who is using the information processing apparatus by a spoofing determination process after establishing a connection for enabling communication between the bio-information measurement device and the information processing apparatus,
    wherein if it is determined that the bio-information measurement device is attached onto or detached from the user or the interval occurring during data acquisition is equal to or longer than the threshold value, the spoofing determination process is performed by comparing the information measured by the bin-information measurement device with a calibration value to determine whether the user wearing the bio-information measurement device is changed, if the information measured by the bio-information measurement device matches the calibration value, it is determined the user wearing the bio-information measurement device is not changed,
    wherein the calibration value is another biometric information measured in a predetermined situation and previously stored.

2. The information processing apparatus according to claim 1, wherein it is determined whether the bio-information measurement device is attached or detached by using at least one of inclination of the bio-information measurement device, power on/off of the bio-information measurement device, communication disconnection of the bio-information measurement device, no transmission from the bio-information measurement device, or cease operation by the user in the bio-information measurement device.

3. The information processing apparatus according to claim 1, wherein the information measured by the bio-information measurement device includes brainwave information, and the processor is configured to detect that the user is changed based on the brainwave information generated in a case where the user views the image or listens to the sound output by the information processing apparatus.

4. The information processing apparatus according to claim 3, wherein the processor is configured to include an image or a sound registered by the user as the image and the sound.

5. The information processing apparatus according to claim 3, wherein the processor is configured to detect that the user is changed by comparing previously measured brainwave information of the user with the brainwave information measured by the bio-information measurement device.

6. The information processing apparatus according to claim 5, wherein the previously measured brainwave information of the user is brainwave information generated in a case where the user views an image or listens to a sound output by the information processing apparatus after establishing a connection for enabling communication between the bio-information measurement device and the information processing apparatus.

7. The information processing apparatus according to claim 1, wherein if the information measured by the bio-information measurement device does not match the calibration value, the processor is further configured to perform a calibration process to generate a current calibration result, and then the current calibration result is compared with the calibration value previously stored.

8. The information processing apparatus according to claim 7, wherein the current calibration result is compared with the calibration value previously stored by determining a difference between a feature amount of the information measured by the bio-information measurement device and a feature amount of the calibration value is less than or equal to a predetermined value, if yes, the information measured by the bio-information measurement device matches the calibration value.

9. A non-transitory computer readable medium storing an information processing program causing a computer that is an information processing apparatus to:
    enable communication between a bio information measurement device and the information processing apparatus,
    add information specifying an individual who is using the information processing apparatus to information measured by the bio-information measurement device, and
    detect that a user wearing the bio-information measurement device is changed using the information measured by the bio-information measurement device with the added information specifying the individual who is using the information processing apparatus by a spoofing determination process after establishing a connection for enabling communication between the bio-information measurement device and the information processing apparatus, wherein if it is determined that the bio-information measurement device is attached onto or detached from the user or the interval occurring during data acquisition is equal to or longer than the threshold value, the spooling determination process is performed by comparing the information measured by the bio-information measurement device with a calibration value to determine whether the user wearing the bio-information measurement device is chanced, if the information measured by the bio-information measurement device matches the calibration value, it is determined the user wearing the bio-information measurement device is not changed, wherein the calibration value is another biometric information measured in a predetermined situation and previously stored.

10. A method for information processing between a bio-information measurement device and an information processing apparatus, the method comprising:

establishing a connection for enabling communication with the bio-information measurement device;

adding information specifying an individual who is using the information processing apparatus to information measured by the bin-information measurement device, and detect that a user wearing the bio-information measurement device is changed using the information measured by the bio-information measurement device with the added information specifying the individual who is using the information processing apparatus by a spoofing determination process, wherein if it is determined that the bio-information measurement device is attached onto or detached from the user or the interval occurring during data acquisition is equal to or longer than the threshold value, the spoofing determination process is performed by comparing the information measured by the bio-information measurement device with a calibration value to determine whether the user wearing the bio-information measurement device is changed, if the information measured by the bio-information measurement device matches the calibration value, it is determined the user wearing the bio-information measurement device is not changed, wherein the calibration value is another biometric information measured in a predetermined situation and previously stored.

11. The method according to claim 10, wherein if the information measured by the bio-information measurement device does not match the calibration value, the processor is further configured to perform a calibration process to generate a current calibration result, and then the current calibration result is compared with the calibration value previously stored.

12. The method according to claim 10, wherein the current calibration result is compared with the calibration value previously stored by determining a difference between a feature amount of the information measured by the bio-information measurement device and a feature amount of the calibration value is less than or equal to a predetermined value, if yes, the information measured by the bio-information measurement device matches the calibration value.

* * * * *